(No Model.)
E. H. AMET.
GRAPHOPHONE OR DEVICE FOR REPRODUCING SOUNDS FROM SOUND WRITINGS.
No. 562,694. Patented June 23, 1896.
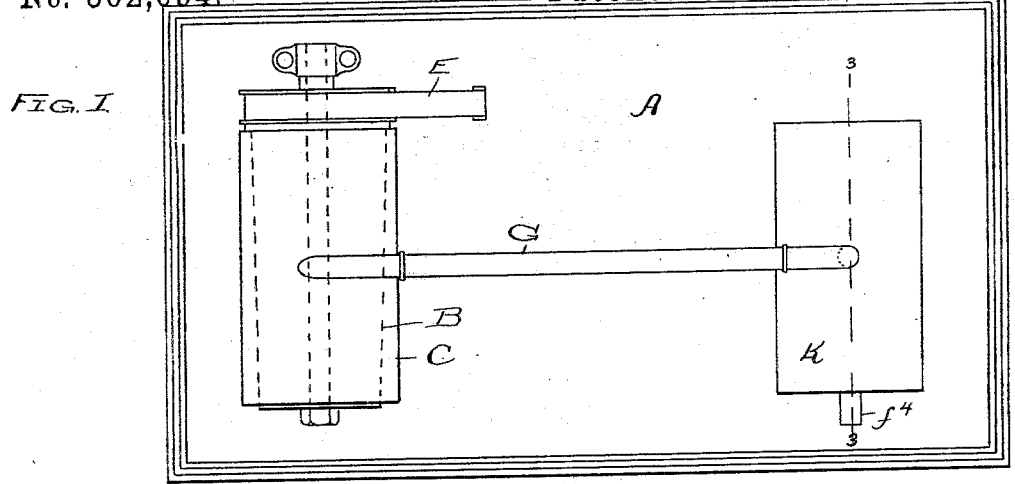
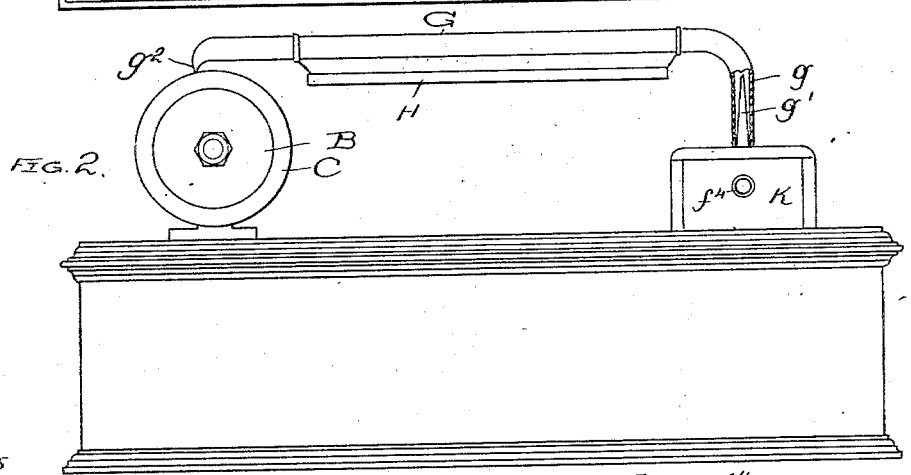
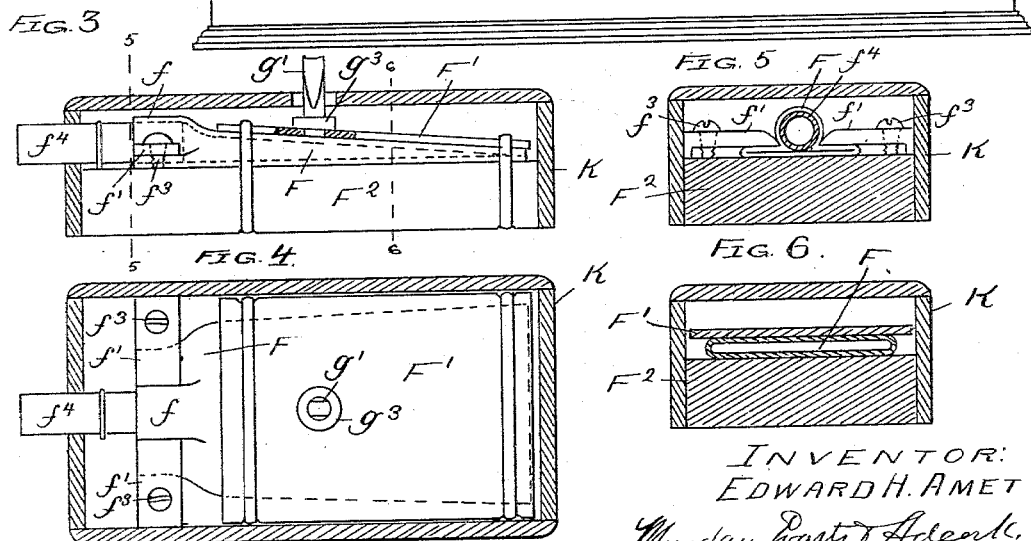
WITNESSES:
Sew. C. Curtis
H. W. Munday
INVENTOR:
EDWARD H. AMET
By Munday, Evarts & Adcock
HIS ATTORNEYS.

UNITED STATES PATENT OFFICE.

EDWARD H. AMET, OF WAUKEGAN, ILLINOIS, ASSIGNOR OF ONE-HALF TO CHARLES DICKINSON, OF CHICAGO, ILLINOIS.

GRAPHOPHONE OR DEVICE FOR REPRODUCING SOUNDS FROM SOUND-WRITINGS.

SPECIFICATION forming part of Letters Patent No. 562,694, dated June 23, 1896.

Application filed November 20, 1895. Serial No. 569,551. (No model.)

*To all whom it may concern:*

Be it known that I, EDWARD H. AMET, a citizen of the United States, residing in Waukegan, in the county of Lake and State of Illinois, have invented a new and useful Improvement in Graphophones or Devices for Reproducing Sounds from Sound-Writings, of which the following is a specification.

My invention relates to improvements in graphophones or devices designed for reproducing from sound-writings articulate speech, music, or other sounds.

The object of my invention is to produce a graphophone or sound-reproducing mechanism of a simple and cheap construction, which will operate to do this work accurately and perfectly, and without producing disagreeable rasping, grating, or interfering sounds.

I have discovered by my experiments that sounds may be perfectly reproduced from phonograms or sound-writings by simply tying or clamping a piece of rubber tubing between two rigid pieces or sticks, preferably of wood, the pieces being preferably tied or pressed closer at one end than at the other, so as to give the flattened rubber tube a somewhat wedging or tapering form. The arm or bar carrying the reproducing-point rests loosely upon one of the rigid pieces between which the rubber tube is clamped, its other or point end resting upon the phonogram-cylinder or sound-record. The free end of the rubber tube which is tied or clamped between the two pieces of wood may be connected to the ordinary ear-tube or to a horn. The rubber or other elastic tube which is compressed between the two rigid pieces may be of any suitable size or construction. In the first machine I constructed I simply tied with two pieces of ordinary string one end of an ordinary graphophone ear-tube between two pieces of light board about three inches long and each about one-half or three-quarters of an inch in width. I, however, prefer to use a somewhat larger size of rubber tubing, and have used with great success tubing of about one inch in diameter, making the wood or other pieces of rigid material correspondingly wider. Any suitable construction or arrangement may be used to cause the reproducing-point to follow the sound-writing. I, however, prefer to mount the reproducing-point upon a freely-swinging arm of glass having a bent end pivotally resting upon one of the pieces of stiff or rigid material between which the rubber tube is clamped, so that the free or point end of the arm may be caused to feed or swing by the spiral thread of the sound-writing itself from one end of the phonogram-cylinder to the other, so that no feed-screw or other mechanism will be necessary for feeding or moving either the phonogram-cylinder on the one hand or the rubber tube and its wood or other clamps on the other hand.

In the accompanying drawings, which form a part of this specification, and in which similar letters of reference indicate like parts, Figure 1 is a plan view of a device embodying my invention. Fig. 2 is a side elevation, partly in section. Fig. 3 is a section on the line 3 3 of Fig. 1. Fig. 4 is a horizontal section through the case containing the rubber tube and the two pieces of wood or other rigid material between which the tube is clamped. Figs. 5 and 6 are cross-sections on lines 5 5 and 6 6, respectively, of Fig. 3.

In the drawings, A represents the frame of the machine, the same being preferably in the form of a box or case inclosing the spring or other motor by which the shaft or holder B for the phonogram-cylinder C is driven by the belt E or other connection.

F is an elastic tube, preferably of rubber, clamped or compressed between two pieces, preferably flat pieces, of stiff or rigid material F' F², the same being preferably of wood. The two pieces F' F² are clamped or tied firmly together at their rear end, so as to close the tube at this rear or inner end, while the two pieces are not clamped so closely together at their front end, so that the tubing between them is given a tapering form from one end of the clamps F' F² to the other. The clamps or pieces of wood F' F² may be in this manner secured or clamped together by any suitable means, but preferably by tying or securing strings or bands around them.

G is the reproducing-point-carrying arm, made preferably of glass, its point end resting upon the phonogram-cylinder or sound-writing and its other end resting loosely upon the upper one F' of the two pieces of wood between which the rubber tube F is clamped or compressed. The arm G is preferably hollow or made of a glass tube, and it is bent at one end to form a right-angle socket $g$ to fit over the upright pin $g'$, which is attached to the clamp-piece F'. The reproducing-point $g^2$ is preferably of glass and formed integral with its carrying-arm G. The pin $g'$ fits loosely in the socket $g$ of the arm G and it is provided, preferably, with a collar or shoulder $g^3$. To increase the weight of the hollow arm G, I attach to it a weight H, preferably by strings or threads.

The reproducing-point-carrying arm G swings laterally or horizontally from one end of the phonogram-cylinder or sound-writing to the other, its bent end $g$ turning on the pin $g'$ as a pivot. It is thus swung laterally or horizontally in the forward or feed direction through the agency of the spiral groove or thread of the sound-writing record itself. It may be swung back or returned to position by hand or by any suitable mechanism for this purpose.

The rubber or elastic tube F is preferably made larger in diameter than the ordinary ear-tubes used with graphophones, and to suitably contract its free end $f$ for connection with such smaller tubing I provide a clamp consisting, preferably, of two metal parts $f'$ $f'$, secured by screws $f^3$ $f^3$ to the lower wood piece F², and which serve to form a fold in the larger tubing and thus contract the diameter of its free end, as indicated in Fig. 5. A short tube $f^4$, preferably of glass, metal, or other rigid material, is preferably employed as a connection between the rubber tube F and the ear tube or horn or other device which may be employed for conveying or distributing the sound.

Any other suitable means known to those skilled in the art may be employed as a substitute or equivalent for the arm G for communicating the sound-vibrations to the rubber tube F, clamped taperingly between the two pieces F' F² of stiff or rigid material.

The sound-reproducing device consisting of the rubber tube F, clamped taperingly between the two pieces of wood F' F², is preferably inclosed in a case K, secured to the frame or box A.

I claim—

1. A sound-reproducing device, consisting in an elastic tube clamped or compressed between two stiff or rigid pieces, and means for transmitting sound-vibrations to one of said stiff or rigid pieces substantially as specified.

2. A sound-reproducing device, consisting in a rubber tube taperingly clamped or compressed between pieces of stiff or rigid material, and means for transmitting sound-vibrations to one of said stiff or rigid pieces substantially as specified.

3. A sound-reproducing device, consisting in an elastic tube clamped between two stiff or rigid pieces, in combination with a rotating phonogram-cylinder, a reproducing-point and means for communicating the sound-vibrations from the reproducing-point to said sound-reproducing device, substantially as specified.

4. A sound-reproducing device, consisting in a rubber tube clamped taperingly between pieces of stiff or rigid material, in combination with a rotating phonogram-cylinder, a reproducing-point and means for communicating the sound-vibrations from the reproducing-point to said sound-reproducing device, substantially as specified.

5. The combination with a rotating phonogram-cylinder, of an elastic tube, two clamps between which said tube is compressed, and a horizontally-swinging arm furnished with a reproducing-point at one end resting upon the phonogram-cylinder and resting at the other end upon the upper one of said clamps, substantially as specified.

6. In a sound-reproducing device, the combination with the tube F, of clamp-pieces F' F², and clamps $f'$ $f'$ for contracting the free end of said tube F, and means for communicating sound-vibrations to one of said clamp-pieces substantially as specified.

EDWARD H. AMET.

Witnesses:
EDMUND ADCOCK,
H. M. MUNDAY.